W. J. GOULD & A. K. JENSEN.
ONE HAND SIFTER.
APPLICATION FILED APR. 10, 1908.
911,493.
Patented Feb. 2, 1909.
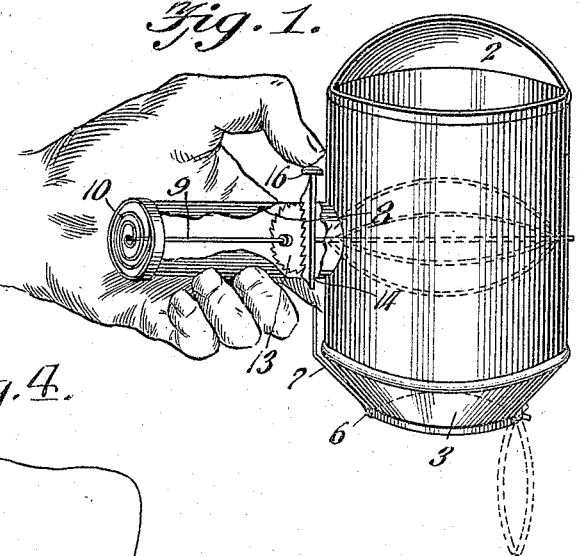
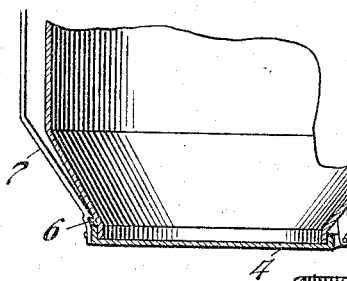
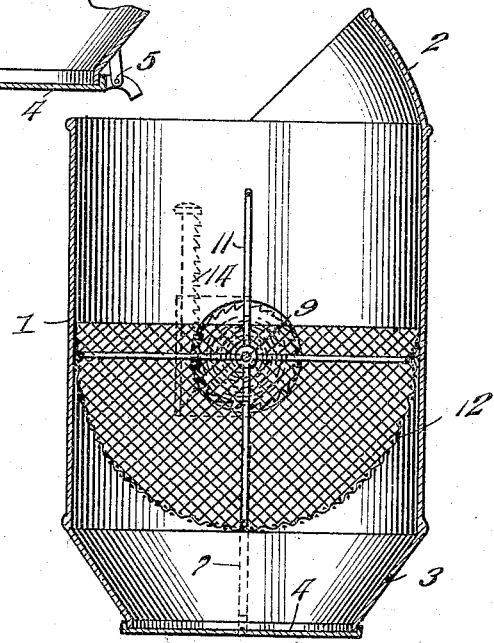
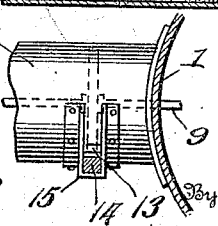
Witnesses
Frank B. Hoffman
P. M. Smith
Inventors
Wilson J. Gould,
Anton K. Jensen.
By Victor J. Evans
Attorney.
THE NORRIS PETERS CO., WASHINGTON, D. C.

UNITED STATES PATENT OFFICE.

WILSON J. GOULD AND ANTON K. JENSEN, OF CRIPPLE CREEK, COLORADO.

ONE-HAND SIFTER.

No. 911,493.  Specification of Letters Patent.  Patented Feb. 2, 1909.

Application filed April 10, 1908. Serial No. 426,408.

*To all whom it may concern:*

Be it known that we, WILSON J. GOULD and ANTON K. JENSEN, citizens of the United States, residing at Cripple Creek, in the county of Teller and State of Colorado, have invented new and useful Improvements in One-Hand Sifters, of which the following is a specification.

This invention relates to sifters for flour and like material, the object of the invention being to provide a one hand sifter or in other words a sifter involving mechanical sifting means adapted to be manipulated by the same hand in which the sifter is held, leaving the other hand perfectly free.

With the above general object in view the invention consists in the novel construction, combination and arrangement of parts herein fully described illustrated and claimed.

In the accompanying drawings, Figure 1 is a perspective view of the sifter contemplated in this invention. Fig. 2 is an enlarged vertical diametrical section through the same. Fig. 3 is a detail horizontal section showing the guide bracket for the rack bar. Fig. 4 is a vertical section through the bottom of the sifter, showing the latch.

In the preferred embodiment of this invention the body of the sifter is of cylindrical form, said body being shown at 1. The body may be of any suitable diameter and length or height and is provided at the top and on one side with an extended scoop 2 preferably formed as an integral part of the body. The lower end of the body is preferably contracted or frusto-conical in shape as shown at 3 and is closed prior to the sifting operation by a drop bottom 4 which is hinged at 5 at one side of the body 1 and held closed at a diametrically opposite point by means of a latch 6 carried by the bottom 4 and engaging a shoulder on the body 1, the latch being extended to form an operating lever 7 by means of which the latch may be operated to release the bottom 4 and allow the same to drop as shown in Fig. 1 by dotted lines.

Extending laterally from one side of the body 1 is a tubular handle 8 in which is arranged a beater shaft 9 the outer end of which is secured to one end of a coiled spring 10 the other end of which is secured to the inside of the handle. The beater shaft 9 extends into and across the body 1 and preferably through the opposite side of the body so as to obtain a bearing for said shaft. Within the body the beater shaft 9 carries a series of semi-circular beater arms 11 which operate above a hemi-spherical screen 12 fastened in the lower portion of the body as shown in Fig. 2.

Within the tubular handle 8 and mounted fast on the shaft 9 is a toothed wheel 13 with which meshes a rack bar 14 the same sliding through a guide bracket 15 secured to one side of the handle 8 as best shown in Fig. 3. The teeth of the rack bar 14 mesh with the teeth of the pinion or toothed wheel 13 and when said rack bar is depressed, rotary motion is imparted to the beater shaft 9. The rack bar 14 is provided at its upper end with a thumb or finger piece 16 to facilitate depressing the same by hand.

From the foregoing description by reference to Fig. 1 it will be observed that when the rack bar 14 is pressed downward, it turns the shaft 9 in one direction and winds up the spring 10. Upon releasing the rack bar 14, the spring imparts a reverse rotation to the shaft 9 and also returns the rack bar 14 to its raised position. Thus while the handle of the sifter is held in one hand, the beater is adapted to be operated by a finger or the thumb of the same hand, leaving the other hand perfectly free. The latch lever 7 is also adapted to be operated by a finger of the same hand for the purpose of dropping the bottom 4, and with the same hand, by means of the scoop 2, the sifter may be partially or wholly filled with the material to be sifted.

Having described the invention, we claim—

A sifter comprising a body or receptacle, a tubular handle extending laterally therefrom, a beater shaft extending lengthwise through the handle and across the body of the receptacle, beater arms on said shaft, a coiled spring encircling said shaft and serving to turn the shaft in one direction, and rack and pinion mechanism for rotating said shaft in opposition to the tension on said spring.

In testimony whereof we affix our signatures in presence of two witnesses.

WILSON J. GOULD.
ANTON K. JENSEN.

Witnesses:
 HARRY S. HILL,
 W. H. BAKER.